UNITED STATES PATENT OFFICE.

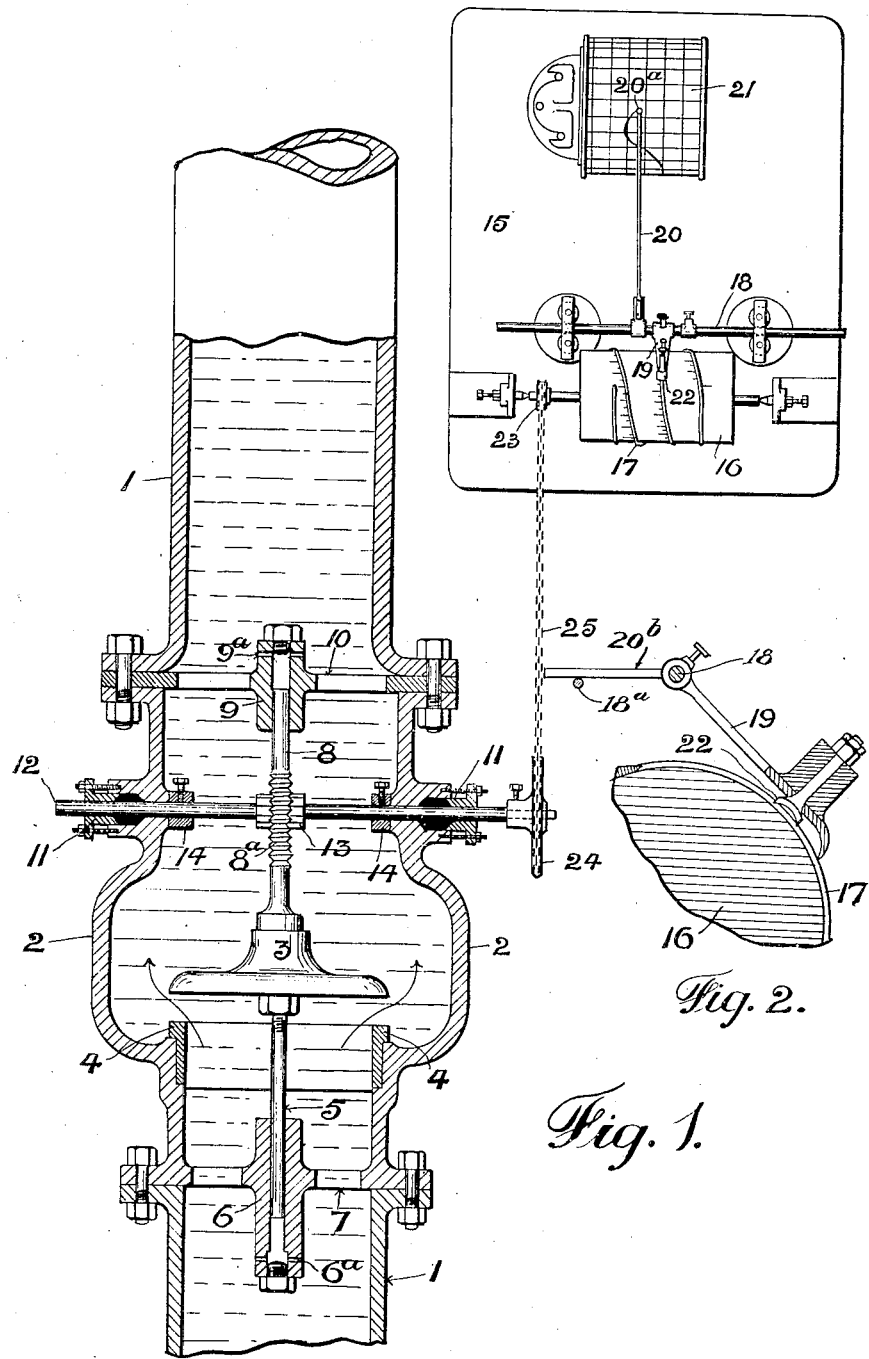

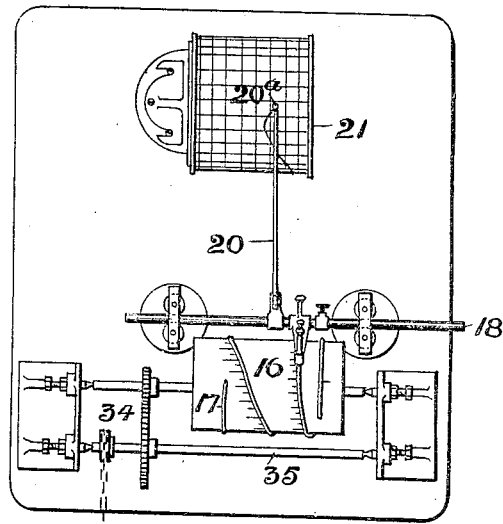
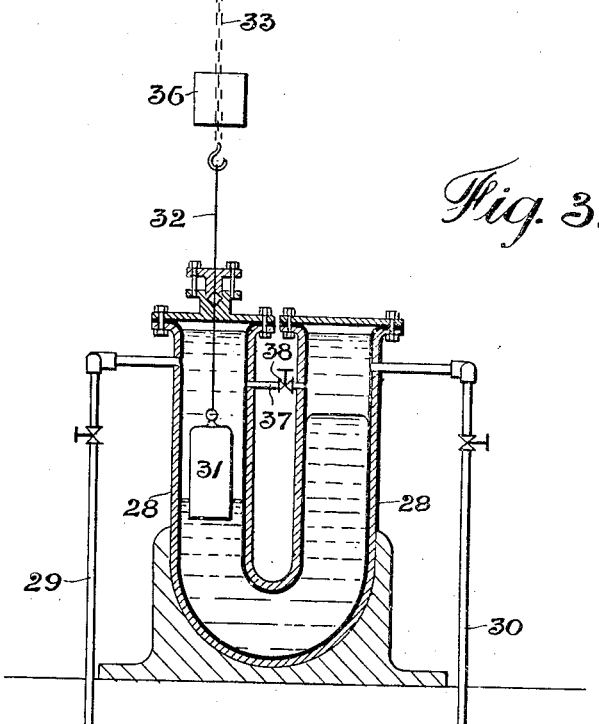

JAMES EDWARD LEA, OF MANCHESTER, ENGLAND.

MEASURING AND RECORDING THE FLOW OF LIQUIDS.

965,915.  Specification of Letters Patent.  Patented Aug. 2, 1910.

Application filed March 4, 1907. Serial No. 360,462.

*To all whom it may concern:*

Be it known that I, JAMES EDWARD LEA, a subject of the King of Great Britain and Ireland, and resident of Manchester, England, have invented certain new and useful Improvements in Measuring and Recording the Flow of Liquids, of which the following is a specification.

The invention relates to and consists of an improved apparatus for measuring and recording the rate of flow of a liquid or gas through a closed pipe.

On the accompanying drawing, Figure 1 illustrates a front view of the recording apparatus as applied in the recording of the flow of a liquid or gas through a closed pipe, the pipe being in section. Fig. 2 illustrates an important detail to a larger scale. Fig. 3 illustrates the recording apparatus as applied to the Venturi system of measuring the flow of a liquid or gas flowing through a closed pipe.

Referring now to Fig. 1, 1 is the closed pipe through which may flow a liquid, such as water, or a gas, such as steam.

2 is a chamber introduced into the length of the pipe, its ends being flanged in order to be joined to the flanged ends of the pipe 1. Within this chamber is a valve 3 which normally rests upon a renewable seating 4. To the underside of the valve is connected a spindle 5 which slidably fits the boss 6 of a cross bridge 7 formed in one with the lower part of the chamber 2. To the upper side of the valve 3 is connected a further spindle 8 which, at its upper end, slidably fits the boss 9 of a detachable cross-bridge 10, this latter being held in position by its outer edge fitting between the pipe flanges and those of the chamber 2 as shown.

Upon the spindle 8 are formed the teeth $8^a$ of a rack. In the boss 9 are small holes $9^a$ and in the boss 6 are small holes $6^a$ whereby as the valve 3 rises or falls no vacuum can be formed behind the spindles, and any liquid or gas that may get behind them will not interfere with the action of the valve, but will tend to give it a steady movement, the small chambers behind the spindles acting as "dash pots."

Rotatably mounted in glands 11 and extending transversely across the chamber 2 is the rotary spindle 12 and in one with or fastened upon such spindle is a pinion 13. The teeth of this latter mesh with the teeth $8^a$ on the spindle 8. For holding the spindle against endwise movements it is provided with adjustable collars 14.

Mounted upon a board 15 or other suitable support, and in any suitable relationship to the pipe, is the recording apparatus comprising a small rotary drum 16, around which is wrapped a wire 17, a sliding rod or bar 18 with arms 19, 20, and a clock-work-driven recording cylinder 21. The arm 19 through a small saddle-shaped swiveling block 22, see Figs. 2 and 5, engages the wire 17 on the drum 16 and the arm 20 carries a pen by which a line is marked on the cylinder 21 when motion is given to the rod 18. Upon the rod 18 is also a further arm $20^b$ which gently rests upon a fixed rod $18^a$ and thus prevents the block 22 leaving the wire 17. Fast upon the axis of the drum 16 is a small sprocket or chain wheel 23, and fast upon the end of the spindle 12, outside the chamber 2 of the pipe, is a larger sprocket wheel 24. Encircling the two wheels 23 and 24 is an endless chain 25. Of course, the manner of transmitting motion from the spindle 12 to the axis of the drum 16 will vary according to the necessities of each case.

With the several parts arranged in the manner described and a liquid or gas caused to flow through the pipe in the direction of the arrows, the valve 3 will rise from its seating and thereby cause a rotation of the spindle 12 and consequently a rotation of the drum 16 and a movement of the pen $20^a$, which will then mark the cylinder 21.

The maximum lift of the valve 3 is preferably equal to one fourth of the interior diameter of the pipe, this being sufficient for the full capacity. The weight of the valve and its spindles being constant in any position, the valve is supported by the difference in pressures above and below it, and, this difference being a constant quantity, the volume of liquid or gas passed is approximately proportional to the lift of the valve. If, therefore, the wire 17 wrapped around the drum 16 of the recording apparatus be set to a helix corresponding to a curve representing the rates of flow in relation to the movements of the valve 3, such wire will serve, when the drum 16 is rotated by the valve, to move the rod 18 and the pen $20^a$ at a rate directly proportional to the rate of flow at any instant, and the marking of the drum will enable the total quantity of liquid or gas passed through the pipe during any interval of time to be easily computed. The lift of the valve in this example being approximately proportional to the rates of flow, the wire 17 will have an approximately regular pitch.

In lieu of a dead weight valve, a hinged valve, or a diaphragm or piston may be used, in which case the movements of the valve, etc., may not be directly proportional to the rates of flow, therefore, the pitch of the wire 17 around the drum 16 will be other than regular. In all cases, however, the drum is graduated or marked with lines alongside the wire, and thus, whether the pitch be regular or irregular, the markings will afford a direct magnified reading of the rate of flow at any moment.

Referring now to Fig. 3, 26 is the closed pipe through which flows the liquid or gas to be measured. 27 is the Venturi tube let into the length of the pipe 26, and 28 is the usual mercury filled U-shaped tube, one limb of which is connected by pipe 29 to the Venturi tube at $a$ and the other limb of which is connected by pipe 30 to the Venturi tube at $b$.

As is well known, the difference in pressure at $a$ and $b$ when a liquid or gas is flowing through the tube 27 serves to depress the level of the mercury in one limb of the tube and raise it in the other, thus, indicating by the difference in levels the rate of flow at any instant.

In combining the recording apparatus therewith use is made of a float 31 placed in the tube 28 as shown, and of a brass wire 32 or the like, which at one end is connected to the float and at the other end passes through a gland packing in the tube end and is connected to a cord or chain 33. This chain or cord passes over a sprocket wheel 34 mounted upon an axis 35 supplementary to that of the drum 16, and at its opposite end the chain or cord is connected to a balance weight 36.

Upon the axis 35 is also a large spur wheel and upon the axis of the drum 16 is a small spur wheel, the two wheels meshing with each other, and when rotated serving to increase the motion of the drum 16 for a given movement of the sprocket wheel 34.

By the principle of the Venturi system the volume of liquid or gas passed through the tube or pipes is proportional to the square root of the difference in the "head" or pressure, between the points $a$ and $b$, $i.\ e.$ between the inlet and throat of the Venturi tube. This difference in "head" is measured by the mercury in the U-shaped tube 28 and the movements of the float 31 are therefore proportional to the difference in the "head" at the point $a$ and $b$. With, therefore, the wire 17 of the drum 16 set to a helix representing a curve which corresponds to the rates of flow in relation to the differences in pressure and movements of the float, and the drum 16 caused to rotate by the movements of the float, the recording pen will be caused to move at a rate directly proportional to the rate of flow at any instant, and thus the area of the diagram produced upon the recording drum will represent the total volume passed during any period of time, which can be readily calculated by a planimeter.

The tube 28 and float 31 will preferably be made of iron and to prevent the mercury percolating through the iron the tube will be lined and the float covered with vulcanite or other suitable substance.

To allow for the mercury being set to zero a cross-pipe 37 with valve 38 is provided.

In all cases the arrangement of the wire 17 around the drum 16 will be determined by calculations based upon well established formulæ, or by experiment, the necessary curve being obtained by plotting heights corresponding say to the variations between rates of flow of a liquid or gas and the movements of a valve or the like acted upon the liquid or gas.

Obviously, in place of the cylinder 21 a rotary disk may be used, the chart or record being printed with radiating lines and concentric circles, to enable the correct values of the markings to be determined.

What I claim is:—

1. Recording apparatus consisting of a rotary drum whereon is a spirally wound wire, a slider bar and bearings therefor, the bar being parallel to the drum axis, a weighted arm on said rod, and lying tangentially to the drum, a swivel block carried by said arm and engaging the wire on the drum, a further arm on said rod, and a fixed rail above which said arm lies holding the block on the drum, a pen-carrying arm also carried by the said rod, and a clock-work driven recording cylinder against which the pen gently presses, in combination with a closed pipe through which a liquid or fluid may pass, and an element acted upon by the said liquid or fluid, and means between the said element and the said drum axis whereby when moved by the liquid or fluid the element transmits its movement to the drum, substantially as herein set forth.

2. Recording apparatus, consisting of a rotary drum whereon is a spirally wound wire, a slider bar and bearings therefor, the bar being parallel to the drum axis, a weighted arm on said rod and lying tangential to the drum, a swivel block carried by said arm and engaging the wire on the drum, a further arm on said rod and a fixed rail above which said arm lies for holding the block on the drum, a pen-carrying arm also carried by the said rod, and a clock-work driven recording cylinder against which the pen gently presses, in combination with a closed pipe through which a liquid or fluid may pass, a tube with contracted portion let into the length of the pipe, a further and closed ended U-shaped tube, pipes connecting each limb of such tube with the wide and narrow parts of the said contracted tube, a supply of mercury in the U-shaped tube, a float within one limb of such tube, and means whereby the movements of the float are transmitted to the drum of recording apparatus, substantially as herein set forth.

3. For use in recording the flow of a gas or a liquid through a closed pipe, a rotary drum whereon is a spirally wound wire, a slider bar and bearings therefor the bar being parallel to the drum axis, a weighted arm on said rod and lying tangentially to the drum, a swivel block carried by said arm and engaging the wire on the drum, a further arm of said rod, a pen-carrying arm also carried by the said rod, and a clock-work driven recording cylinder against which the pen gently presses, substantially as herein set forth.

In witness whereof I have hereunto set my hand in the presence of two witnesses.

JAMES EDWARD LEA.

Witnesses:
 JOHN CAMP,
 P. D. BAILEY.